US006810237B1

(12) United States Patent
McEowen

(10) Patent No.: US 6,810,237 B1
(45) Date of Patent: Oct. 26, 2004

(54) COMBINATION LANYARD AND EXTERNAL ANTENNA FOR WIRELESS COMMUNICATION DEVICE

(75) Inventor: James R. McEowen, Holmdel, NJ (US)

(73) Assignee: BellSouth Intellectual Property Corporation, Wilmington, DE (US)

( * ) Notice: Subject to any disclaimer, the term of this patent is extended or adjusted under 35 U.S.C. 154(b) by 546 days.

(21) Appl. No.: 09/752,148

(22) Filed: Dec. 29, 2000

Related U.S. Application Data

(60) Provisional application No. 60/177,401, filed on Jan. 21, 2000.

(51) Int. Cl.[7] .................................................. H04Q 7/20

(52) U.S. Cl. .................... 455/83; 455/575.6; 455/575.7

(58) Field of Search ............................ 455/82–83, 274, 455/344, 346, 351, 575.1, 575.6, 575.7, 90.3; 379/142

(56) References Cited

U.S. PATENT DOCUMENTS

| | | | | |
|---|---|---|---|---|
| 4,769,656 A | | 9/1988 | Dickey | |
| 4,977,614 A | | 12/1990 | Kurcbart | |
| 5,280,645 A | * | 1/1994 | Nguyen | 455/274 |
| 5,499,398 A | * | 3/1996 | Kudoh | 455/290 |
| 5,564,082 A | * | 10/1996 | Blonder | 455/90 |
| 5,619,531 A | | 4/1997 | Taylor et al. | |
| 5,659,325 A | * | 8/1997 | Belcher | 343/718 |
| 5,677,948 A | * | 10/1997 | Meister | 379/142.01 |
| 5,727,020 A | | 3/1998 | Taylor et al. | |
| 5,764,693 A | | 6/1998 | Taylor et al. | |
| 5,917,854 A | | 6/1999 | Taylor et al. | |
| 5,926,144 A | | 7/1999 | Bolanos et al. | |
| 6,005,524 A | * | 12/1999 | Hayes | 343/702 |
| 6,011,519 A | * | 1/2000 | Sadler | 343/742 |
| 6,094,566 A | * | 7/2000 | Dasent et al. | 455/575.6 |
| 6,292,145 B1 | * | 9/2001 | Yu | 343/402 |

FOREIGN PATENT DOCUMENTS

| | | |
|---|---|---|
| FR | 2745964 | 9/1997 |

OTHER PUBLICATIONS

"Wrist Trackball Pointing Device," IBM TDB, v36 n12 12–93, pp. 173–174, Order: 93A 63350, Dec. 1993.

"Pointers from Dick Tracy," *Information Week*, Issue 586, p. 10, Jun. 28, 1996.

Clarke, Peter, "Team gets handle on wrist communicator," *Electronic Engineering Times*, Issue 1085, p. 141, Nov. 1, 1999.

* cited by examiner

*Primary Examiner*—William Trost
*Assistant Examiner*—Brandon Miller
(74) *Attorney, Agent, or Firm*—Cantor Colburn LLP

(57) ABSTRACT

A combination lanyard and external antenna for use with wireless communication devices such as interactive pagers or telephones. The lanyard antenna is connected to wireless communication devices to improve radio frequency transmission and reception performance for wireless communication devices. The device increases the gain and maximizes radiation efficiency. An antenna conductive element is embedded within, runs alongside, or is woven into a flexible strength member to form the lanyard antenna. The antenna conductive element is formed from a wire, wire braid, or wire mesh produced from a flexible, conductive material, while the flexible strength member is non-binding, non-twisting, and produced from nonconductive material.

29 Claims, 1 Drawing Sheet

COMBINATION LANYARD AND EXTERNAL ANTENNA FOR WIRELESS COMMUNICATION DEVICE

This application claims the benefit of U.S. Provisional Application No. 60/177,401, filed Jan. 21, 2000.

FIELD OF THE INVENTION

This invention relates to an antenna for wireless communication devices. An embodiment of the invention includes a flexible lanyard antenna that is well suited for use with pagers such as interactive messaging pagers or cellular or mobile telephones.

BACKGROUND OF THE INVENTION

In general, communication devices may be divided into two categories - wireline and wireless. Conventional wireless communication devices utilize the radio frequency (RF) spectrum; however, other medium can be used including, but not limited to, the infrared spectrum and microwave technology. Examples of wireless communication devices include pagers, interactive messaging pagers, telephones, personal digital assistants (PDAs), and the like.

Antennas for wireless communication devices are designed according to ideal physical dimensions that typically correspond to half of a wave length or dipole. For many types of wireless communication devices, however, it may be difficult to achieve these ideal dimensions due to the size of the device or due to the manner in which the device is designed to be utilized. For example, pagers are generally designed to be worn on the belt, or near the waist, of a user and have a display that is designed to be viewed at close to arm's length, generally from above.

One type of pager that is becoming more common is an interactive messaging pager. Interactive messaging pagers are generally disclosed, for example, in U.S. Pat. Nos. 5,619,531; 5,727,020; 5,764,693; and 5,917,854, the disclosures of which are hereby incorporated herein by reference.

Whereas traditional pagers utilize a receiver and an antenna that permit the pager to receive signals, interactive messaging pagers utilize a transceiver and an antenna and/or antennas that permit the pager both to receive and to transmit. A problem with many interactive messaging pagers is that their antennas are internal and, therefore, are unable to achieve an effective length corresponding to an ideal dipole and/or are unable to avoid being shielded by other device components or by the body of the wearer. Furthermore, these generally small antennas have limited energy transfer capabilities due to the constraints of the physical size of the paging instrument. Another limitation of these small antennas is that the greatest power transfer to a circuit requires impedance matching with a resonant tuned antenna circuit. The theory of small antennas is further set forth in *Small Antennas* by Harold A. Wheeler published in IEEE Transactions on Antennas and Propagation, volume AP-23, No. 4, July 1975 and also in *Antenna Engineering Handbook*, Second Edition, published by McGraw Hill, 1984.

A major design problem for paging instrument antennas has always been how to maximize the antenna sensitivity while minimizing the design complexity and minimizing the interconnection between the antenna(s) and the receiver and/or the transceiver. What is needed is an antenna design which can be utilized to maximize the antenna sensitivity when utilized with the paging device. What is also needed is an antenna design which can be easily changed to provide additional antenna sensitivity when needed. Likewise, an antenna design which can address similar problems associated with the use of cellular telephones is also needed.

SUMMARY OF THE INVENTION

The present invention provides unobtrusive and convenient antennas for a wireless communications device that (1) operate as a lanyard, (2) maximize reception, (3) maximize transmission, (4) utilize reasonably broad bandwidths, (5) exhibit good directional characteristics, (6) exhibit the ability to adapt to antenna sensitivity, and (7) conform to the physical constraints of the paging instrument (i.e., the antenna is an appropriate size for the device).

In a first aspect, an antenna of the present invention comprises a lanyard antenna. As utilized herein, the term lanyard generally refers to a flexible cord-like structure of the type generally utilized to secure physical items to an individual.

The lanyard antenna may be attached to a person's clothing and to the portable communication device where the lanyard will provide an improved antenna and also provide additional security against the portable communications device being dropped. The lanyard antenna need not be disconnected from the person's clothing for use. Rather, the extension of the lanyard during use of the portable communications device will enhance the receptivity of the antenna, as much of the length of the antenna is situated some distance away from both the person's body and the communication device.

A lanyard antenna of the present invention is particularly well suited for use with pagers and in particular with interactive messaging pagers. The antenna increases transmission and reception performance and, thereby, increases the operating range of the pagers. The antenna may be a dipole of ½, ¼, ⅛, or any wavelength. The antenna further may be center-loaded or end-loaded. It could also take the form of a loop antenna in which both ends are coupled to transmitter circuitry, receiver circuitry, or both.

According to a first embodiment of the present invention a lanyard antenna comprises at least one continuous antenna conductive element that is embedded within a flexible strength member. The total length of the flexible strength member may be longer than the total length of the antenna conductive element.

The flexible strength member is preferably non-binding, non-twisting, and produced from nonconductive material, such as, natural and/or synthetic compositions. The antenna conductive element is preferably formed from at least one distinct wire, wire braid, or wire mesh that is produced from a flexible conductive material, such as beryllium copper, copper, aluminum, iron alloys, or phosphor bronze.

According to a second embodiment of the present invention a lanyard antenna comprises at least one antenna conductive element. The antenna conductive element is preferably formed from at least one distinct wire, wire braid, or wire mesh that is fashionably designed and is produced from a flexible conductive material, such as beryllium copper, copper, aluminum, iron alloys, or phosphor bronze.

In another aspect the present invention comprises a wireless communications device with a lanyard antenna of the present invention. The wireless communications device may comprise a pager, an interactive messaging pager, a telephone (portable, cellular, mobile, satellite, etc.), a PDA, or other wireless communications device.

The objects, features, and advantages of the present invention are described in more detail below with reference to the embodiment depicted in the attached drawings. Further objects, features, and advantages of the present invention will be apparent from the description provided.

BRIEF DESCRIPTION OF THE DRAWINGS

Other objects and advantages of the invention will be more clearly understood by reference to the following description taken in connection with the accompanying drawings, in which.

DETAILED DESCRIPTION

Figure 2:
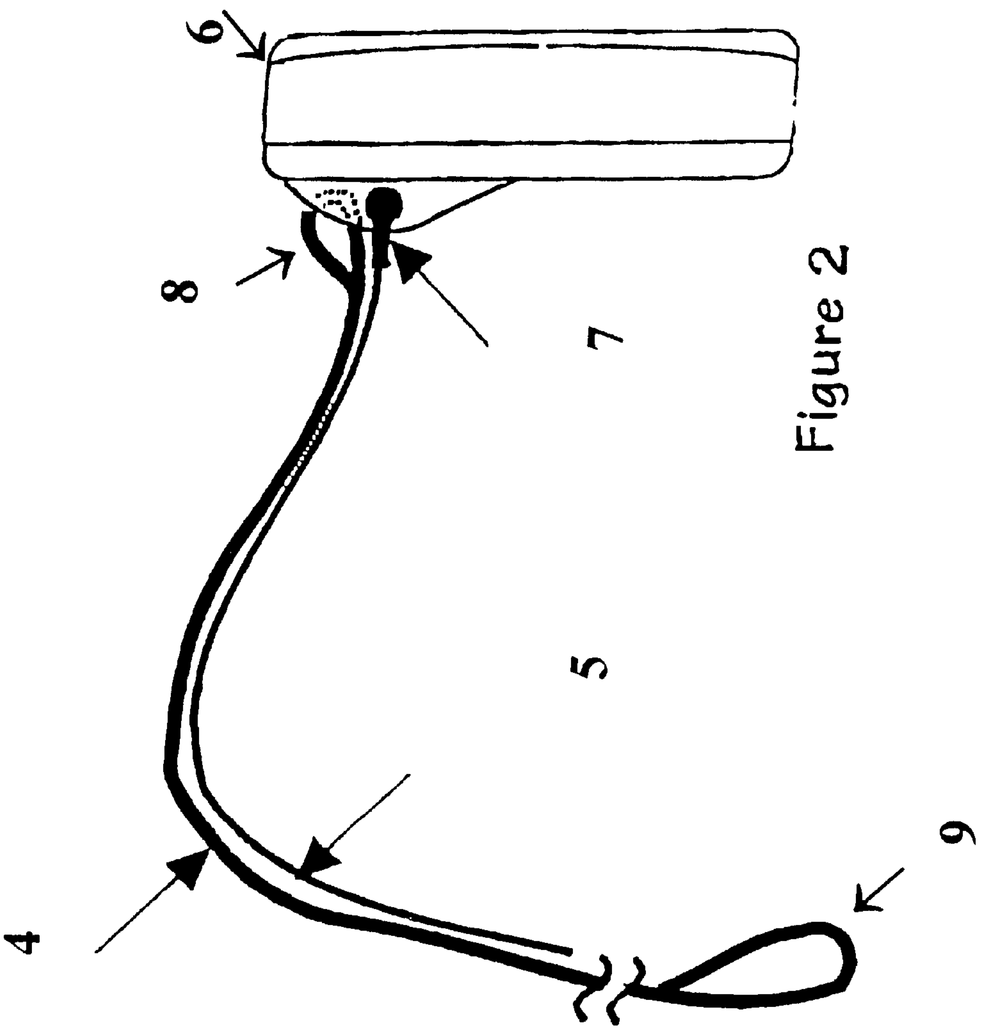
FIG. 2 depicts an embodiment of the present invention having a lanyard with an embedded antenna and illustrating how a lanyard antenna attaches to a wireless telephony device.

As set forth above, the present invention provides unobtrusive and convenient antennas for a wireless communications device that (1) operate as a lanyard, (2) maximize reception, (3) maximize transmission, (4) utilize reasonably broad bandwidths, (5) exhibit good directional characteristics, (6) exhibit the ability to adapt to antenna sensitivity, and (7) conform to the physical constraints of the paging instrument (i.e., the antenna is an appropriate size for the device). According to an embodiment of the present invention, a lanyard antenna comprises at least one continuous antenna conductive element that is embedded within a flexible strength member. The total length of the flexible strength member may be longer than the total length of the antenna conductive element.

The flexible strength member is preferably non-binding, non-twisting, and preferably produced from non-conductive material which insulates the antenna. Suitable nonconductive materials include, but are not limited to: natural or synthetic polymers; nylon; cotton; wool; and mixtures thereof. The nonconductive material may comprise a knitted sleeve produced, for example, by circular knitting techniques, or a woven sleeve. The sleeve may be produced from synthetic and/or natural yarns.

The antenna conductive element may be woven into the flexible strength member, encircled by the flexible strength member, coupled side-by-side to the flexible strength member or otherwise incorporated within the flexible strength member. The antenna conductive element is preferably formed from at least one distinct wire, wire braid, or wire mesh which extends along the length of the lanyard. The antenna conductive element may be produced from a flexible conductive material, such as beryllium copper, copper, aluminum, iron alloys, or phosphor bronze.

One end of the lanyard antenna may be divided into two branches. One branch is the signal lead and is inserted into the interior of the wireless telephony device, where it attaches to the antenna output and input of the radio device. The invention is applicable as an antenna for a radio device, and, therefore, the phrase "radio device" used herein means radio receiver, radio transmitter, and radio transceiver. The other branch is the lanyard channel to secure the lanyard antenna to the wireless telephony device. The other end of the lanyard antenna is designed to secure the wireless telephony device to a person, such as, looping the lanyard around a person's belt, or affixing it with a clip. Alternatively, the lanyard antenna could be designed such that connecting the signal lead to the wireless telephony device also serves to attach it mechanically to the device in a secure manner.

As will be realized by those of ordinary skill in the art from the foregoing description, the present invention presents a device that combines a lanyard with an antenna or antennas to improve radio frequency transmission and reception performance for wireless communications devices. Basically, it increases the gain and maximizes radiation efficiency. As a consequence, it increases transmitter radiated power output (called "effective radiated power" or ERP) and increases effective received sensitivity.

The antenna conductor or conductive element may be a dipole of full, ½, ¼, ⅛ or any other desired wavelength. A dipole antenna may be end-or center-loaded via coupling to the transmitter circuitry, receiver circuitry or both. It may be coupled to such circuitry with matching circuitry such as inductive, capacitative or both types of components. The antenna could also be a non-harmonically-cut length of conductive material coupled to the circuitry via matching circuitry. It could also take the form of a loop antenna in which both ends are coupled to transmitter circuitry, receiver circuitry, or both. In fact, the antenna element could take the form and perform the function and achieve the results of any sort of antenna element that is desired for the application, taking into account gain and other performance characteristics, durability, cost, strength and appearance parameters. The antenna conductive element is preferably accompanied by a flexible strength member such as a lanyard or cord which absorbs the tensile strength imposed by handling the device from the belt or other article of clothing. The conductive element and strength member may form part of the same structure that both acts as an antenna and absorbs the strength; alternatively, they may be the same structural member. For example, the conductive element could be a metallic element located substantially coaxially inside a length of cord or plastic tubing; alternatively, it could be located alongside a cord or lanyard; still further, the metallic element could be the flexible element that also acts as the strength member.

Figure 1:
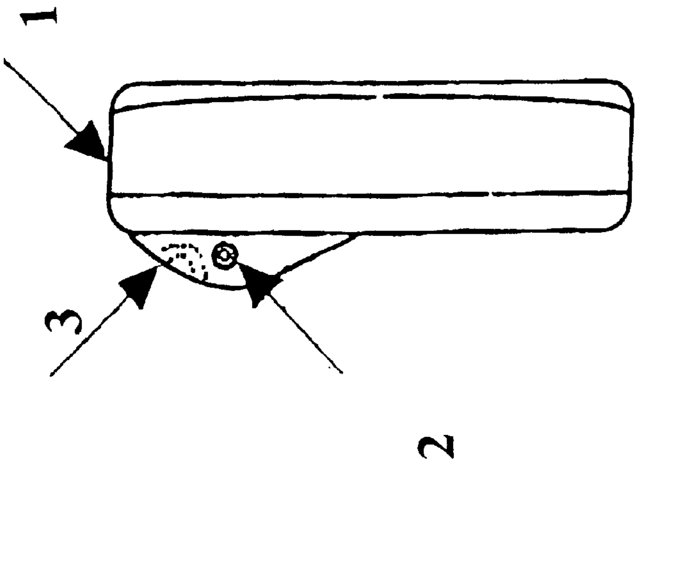
FIG. 1 depicts an embodiment of the present invention having a wireless telephony device with an antenna connection and a lanyard channel for a lanyard antenna.

Referring now to FIG. 1 of the drawing, the wireless telephony device 1 is shown from the side view with an antenna connector 2 and with a lanyard channel 3. By way of example, and not intended to be limiting in the invention claimed, the present application contemplates an interactive messaging pager operating at a frequency of approximately 900 MHz and transmitting a coded signal by modulating the carrier wave with frequency shift keying, in accordance with a prescribed protocol, in order to transmit and receive wireless communications.

FIG. 2 of the drawing illustrates the component parts of a preferred form of the invention. Shown generally is a flexible strength member 4 having an embedded antenna conductive element 5 for sending and/or transmitting radio frequency signals to and from the wireless telephony device 6. In accordance with the preferred embodiment at 900 MHz, the length of the lanyard antenna would be one-half wave length at 900 MHz, or approximately six and one-half inches. Calculating antenna length of a ½ wave dipole for optimum performance is conventional. The length (in inches) equals 5904 divided by the frequency (in MHz) multiplied by a conventional computational factor related to conductor diameter. Cellular mobile radiotelephone networks operate in the frequency range of 825–890 MHz. Thus, a −½ wave dipole for use with a cellular telephone would be approximately seven inches. The invention is also applicable to lanyard antennas suitable for use at other frequencies in the VHF and UHF bands ranging from 30

MHz to 3 GHz, with respective lanyard antenna lengths. Loading coils can be incorporated into the lanyard antenna structure to alter the effective length or "electrical length" of the antenna. Furthermore, the flexible strength member or antenna conductive element could contain separate antenna conductors (which might be of different lengths) for transmission and reception.

The flexible strength member 4 may be of continuous length with the antenna conductive element 5. The ends of the antenna conductive element 5 may terminate at the respective ends of the flexible strength member 4. The ends are arranged within the strength member so that when the lanyard antenna is stretched, they will flex and allow the lanyard antenna to become longer to permit the wireless telephony device to be arranged away from the body without damaging or breaking the flexible strength member or the embedded antenna conductive element.

One end of the lanyard antenna is divided into two branches. One branch is the signal lead 7 and is inserted into the antenna connector 2 of the wireless telephony device 6; the other branch 8 secures the lanyard antenna and attaches to the lanyard channel 3 of the wireless telephony device 6. The other end of the lanyard antenna is attached to a lanyard handle member 9 and is designed to secure the wireless telephony device to a person, such as looping the end of the lanyard antenna around a person's belt.

It should be clearly understood that the forms of the present invention herein described are illustrative only and are not intended to limit the scope of the invention. Further, applications and modifications that may be devised by those skilled in the art, such as, for example, one use of loading coils to vary the "electrical" length of the antenna, the use of two separate antennas for transmission and reception, and the use of an external lanyard antenna in combination with an internal antenna to provide a "diversity" antenna arrangement, are included within the scope of the present invention.

What is claimed is:

1. An apparatus comprising:

a wireless telephony device;

a lanyard antenna including at least one antenna conductive element and a flexible strength member, wherein the at least one antenna conductive element is enbedded in the flexible strength member and coupled to at least one of a transmitter and a receiver of the wireless telephony device, and the at least one antenna conductive element has a length that is a function of at least a frequency range operation of the wireless telephony device and a desired gain; and wherein the flexible strength member is substantially non-twisting and includes one end coupled to the wireless telephony device and the other end adapted to be connected to an article of clothing of a user in a manner that allows the flexible strength member at least partially to suspend the wireless telephony device from said clothing, said flexible strength member being a single, continuous member and said antenna conductive element being a single, continuous element, said other end being unsecured to said one end to be connected to said article of clothing independent of said one end.

2. The apparatus of claim 1, wherein the at least one antenna conductive element is a dipole.

3. The apparatus of claim 1, wherein the at least one antenna conductive element is a half-wave dipole.

4. The apparatus of claim 1, wherein the at least one antenna conductive element is coupled to the at least one of a transmitter and a receiver of the wireless telephony device with a matching circuitry that includes components selected from a group consisting of an inductive component, a capacitative component, or both.

5. The apparatus of claim 1, wherein the at least one antenna conductive element is end-loaded.

6. The apparatus of claim 1, wherein the wireless telephony device is an interactive messaging pager.

7. The apparatus of claim 6, wherein the at least one antenna conductive element is substantially six and one-half inches in length.

8. The apparatus of claim 1, wherein the wireless telephony device is a cellular telephone.

9. The apparatus of claim 1, wherein the at least one conductive element and the flexible strength member are the same structural member.

10. The apparatus of claim 1, wherein the at least one conductive element is located alongside the flexible strength member.

11. The apparatus of claim 1, wherein the at least one antenna conductive clement is a random length wire antenna.

12. The apparatus of claim 1, wherein the other end of the flexible strength member is adapted to be connected to the article of clothing by a loop.

13. The apparatus of claim 1, wherein the other end of the flexible strength member is adapted to be connected to the article of clothing by a clip.

14. An apparatus comprising:

a wireless telephony device;

a lanyard antenna including at least one antenna conductive element and a flexible strength member, wherein the at least one antenna conductive element is embedded in the flexible strength member and coupled to at least one of a transmitter and a receiver of the wireless telephony device, and the at least one antenna conductive element includes a half-wave dipole; and wherein the flexible strength member is substantially non-twisting and includes one coupled to the wireless telephony device and the other end adapted to be connected to an article of clothing of a user in a manner that allows the flexible strength member at least partially to suspend the wireless telephony device from said clothing, said flexible strength member being a single, continuous member and said antenna conductive element being a single, continuous element, said other end being secured to said one end to be connected to said article of clothing independent of said one end.

15. The apparatus of claim 14, wherein the at least one antenna conductive element is coupled to the at least one of a transmitter and a receiver of the wireless telephony device with a matching circuitry that includes components selected from a group consisting of an inductive component, a capacitative component, or both.

16. The apparatus of claim 14, wherein the at least one antenna conductive element is end-loaded.

17. The apparatus of claim 14, wherein the wireless telephony device is an interactive messaging pager.

18. The apparatus of claim 17, wherein the least one antenna conductive element is substantially six and one-half inches in length.

19. The apparatus of claim 14, wherein the wireless telephony device is a cellular telephone.

20. The apparatus of claim 14, wherein the at least one conductive element and the flexible strength member are the same structural member.

21. The apparatus of claim 14, wherein the at least one conductive element is located alongside the flexible strength member.

22. The apparatus of claim 14, wherein the other end of the flexible strength member is adapted to be connected to the article of clothing by a loop.

23. The apparatus of claim 14, wherein the other end of the flexible strength member is adapted to be connected to the article of clothing by a clip.

24. An apparatus comprising:

an interactive messaging pager;

a lanyard antenna including at least one antenna conductive element and a flexible strength member wherein the at least one antenna conductive element is embedded in the flexible strength transmitter and coupled to at least one of a transmitter and a receiver of the interactive messaging pager with a matching circuitry that includes components selected from a group consisting of an inductive component, a capacitative component, or both, the at least one antenna conductive element comprising a half-wave dipole; and wherein the flexible strength member is substantially non-twisting and includes one end coupled to the interactive messaging pager and the other end adapted to be connected to an article of clothing of a user in a manner that allows the flexible strength member at least partially to suspend the interactive messaging pager from said clothing, said flexible strength member being a single, continuous member and said antenna conductive element being a single, continuous element, said other end being unsecured to said one end to be connected to said article of clothing independent of said one end.

25. The apparatus of claim 24, wherein the at least one antenna conductive element is substantially six and one-half inches in length.

26. The apparatus of claim 24, wherein the at least one conductive element and the flexible strength member arc the same structural member.

27. The apparatus of claim 24, wherein the at least one conductive element is located alongside the flexible strength member.

28. The apparatus of claim 24, wherein the other end of the flexible strength member is adapted to be connected to the article of clothing by a loop.

29. The apparatus of claim 24, wherein the other end of the flexible strength member is adapted to be connected to the article of clothing by a clip.

* * * * *